(12) United States Patent
Negishi et al.

(10) Patent No.: US 9,106,094 B2
(45) Date of Patent: Aug. 11, 2015

(54) WIRELESS CHARGING SYSTEM METHOD OF CONTROLLING WIRELESS CHARGING OF A RECHARGEABLE BATTERY

(75) Inventors: Hideki Negishi, Kanagawa (JP); Hidekatsu Yamada, Kanagawa (JP); Yu Nishino, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 572 days.

(21) Appl. No.: 13/434,343

(22) Filed: Mar. 29, 2012

(65) Prior Publication Data

US 2012/0249064 A1 Oct. 4, 2012

(30) Foreign Application Priority Data

Mar. 29, 2011 (JP) ................. 2011-073662

(51) Int. Cl.
*H02J 7/00* (2006.01)
*H02J 7/02* (2006.01)

(52) U.S. Cl.
CPC ...................... *H02J 7/025* (2013.01)

(58) Field of Classification Search
CPC ........ H02J 7/025; H01F 38/14; Y02T 90/122; B60L 11/182; Y02E 60/12
USPC ........................................ 320/108
See application file for complete search history.

(56) References Cited

U.S. PATENT DOCUMENTS

| | | | |
|---|---|---|---|
| 7,733,215 B2 | 6/2010 | Kozuma et al. | |
| 8,222,991 B2 | 7/2012 | Kozuma et al. | |
| 8,446,251 B2 | 5/2013 | Kozuma et al. | |
| 2002/0089305 A1* | 7/2002 | Park et al. | 320/108 |
| 2006/0145660 A1* | 7/2006 | Black et al. | 320/108 |
| 2007/0139000 A1* | 6/2007 | Kozuma et al. | 320/108 |
| 2010/0225172 A1 | 9/2010 | Kozuma et al. | |
| 2012/0274151 A1 | 11/2012 | Kozuma et al. | |
| 2013/0241288 A1 | 9/2013 | Kozuma et al. | |

FOREIGN PATENT DOCUMENTS

| | | |
|---|---|---|
| JP | 2006-246633 A | 9/2006 |
| JP | 2007-336717 A | 12/2007 |
| JP | 2010-207017 A | 9/2010 |

OTHER PUBLICATIONS

Notice of Reasons for Rejection issued to JP Application No. 2011-073662, mailed Oct. 28, 2014, pp. 1-3.
Notice of Reasons for Rejection issued to JP Application No. 2011-073662, mailed May 12, 2015.

* cited by examiner

*Primary Examiner* — Arun Williams
(74) *Attorney, Agent, or Firm* — Hoffmann & Baron, LLP

(57) ABSTRACT

An object of the present invention is to provide a wireless charging system and a control method thereof, as well as a portable electronic device and a charging device, all of which are capable of performing charging at an appropriate charging level. The wireless charging system includes: a battery charger 100; and a cellular telephone device 1. The cellular telephone device 1 includes: a plurality of power receiving units 10; a charging state monitoring unit 21; and a cellular telephone device side communication unit 14. The battery charger 100 includes: a plurality of power transmitting units 110 that transmit power to the cellular telephone device 1; a battery charger side communication unit 140; and a power transmission control unit 121 that controls transmission of power by the power transmitting units 110, based on a result of monitoring by the charging state monitoring unit 21.

7 Claims, 9 Drawing Sheets

FIG. 1
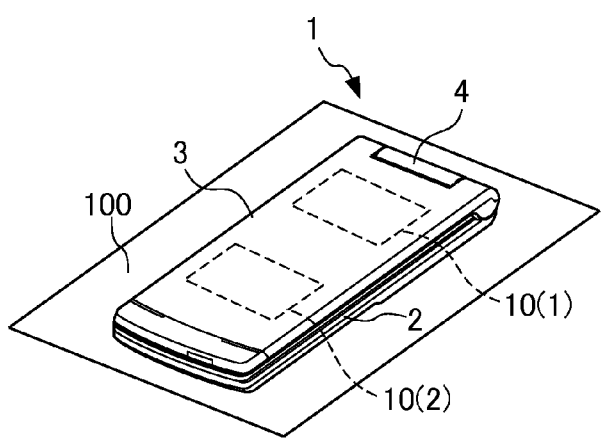
(a)
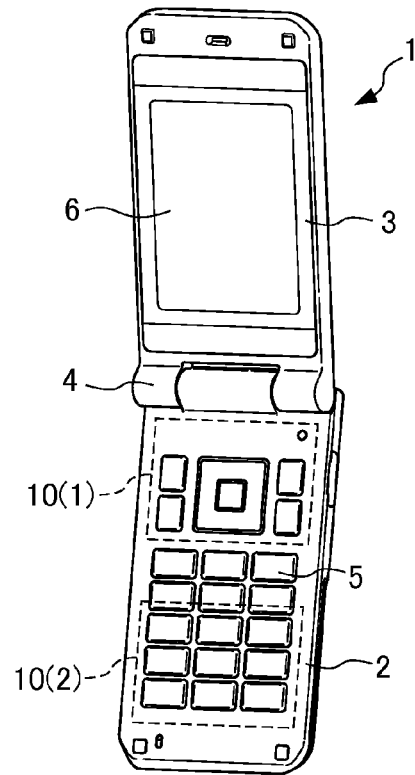
(b)
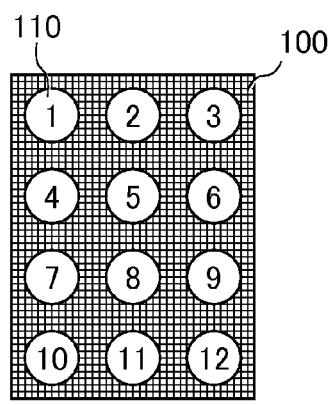
(c)

FIG. 2
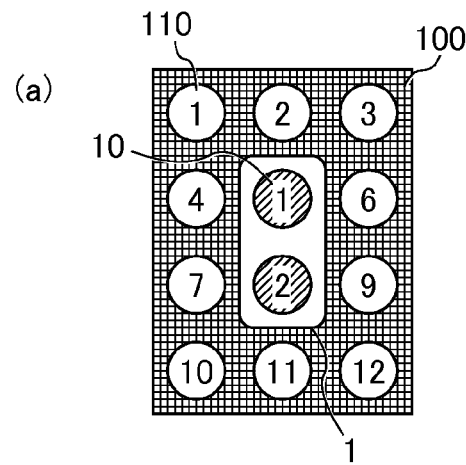
(a)
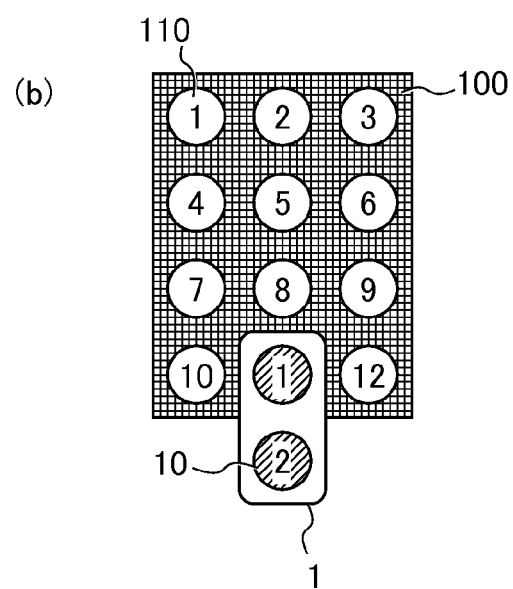
(b)
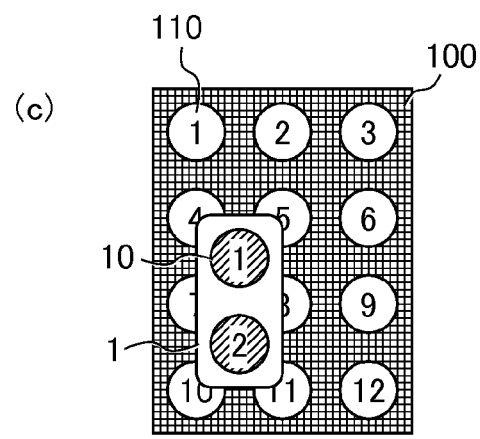
(c)

FIG. 5
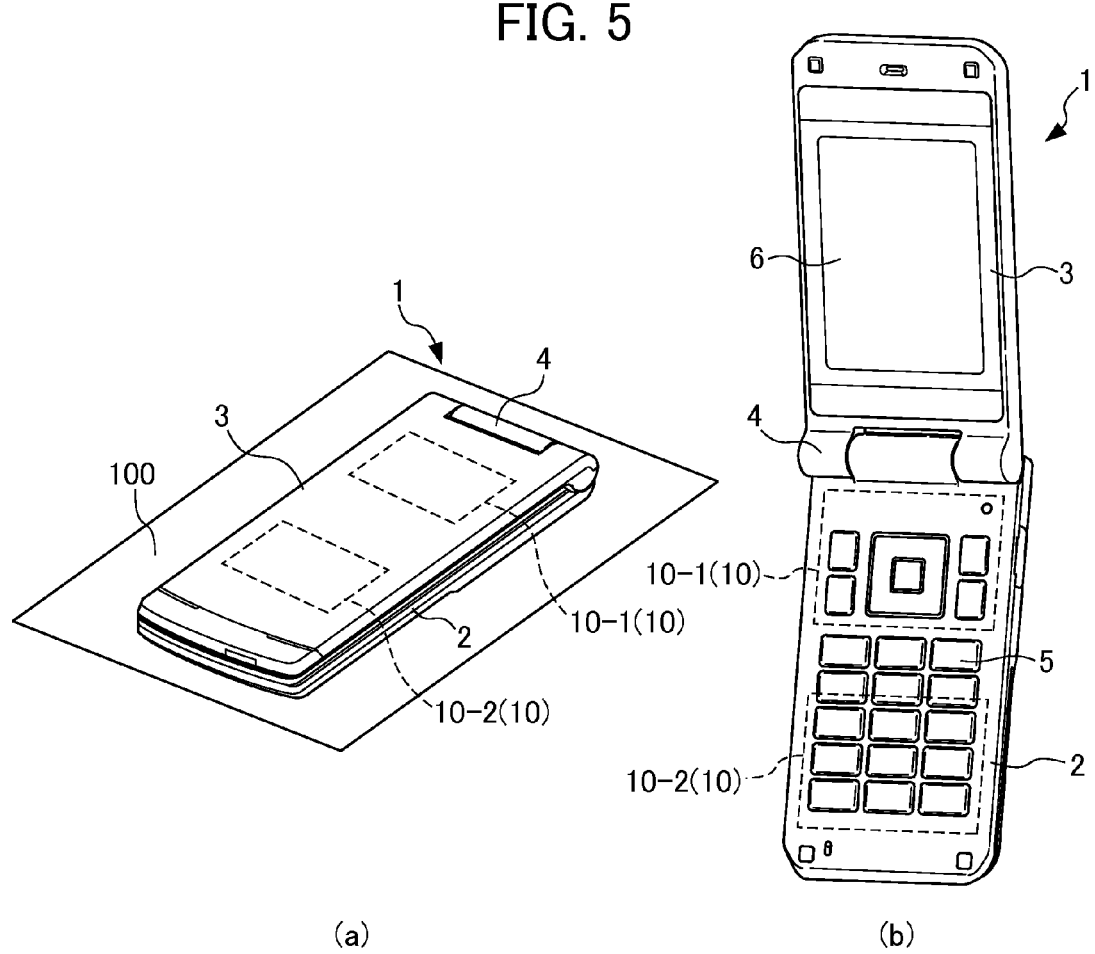
(a)  (b)
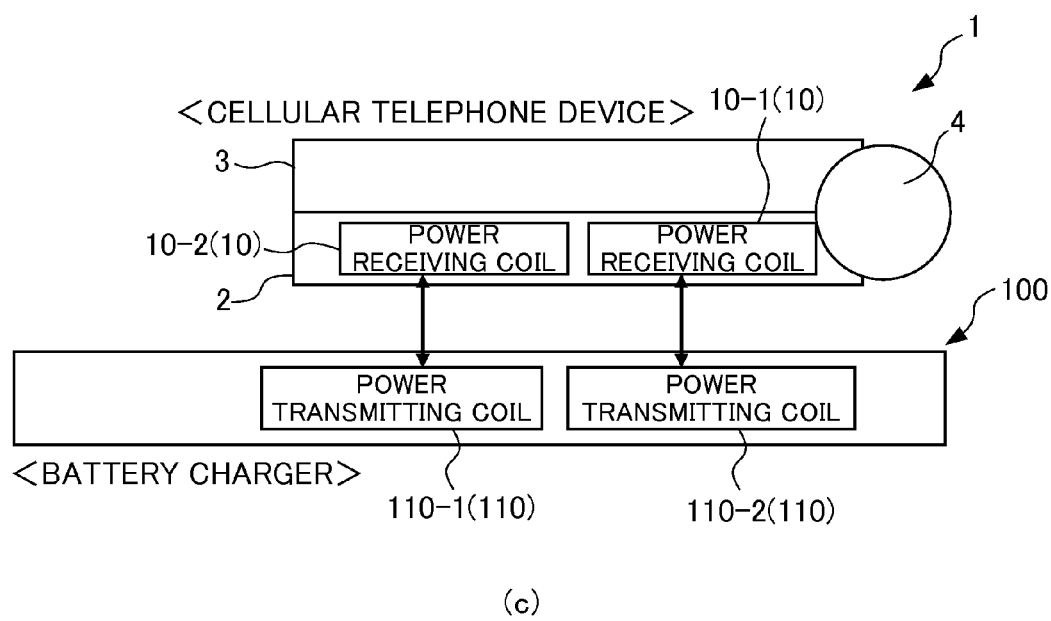
(c)

FIG. 6

(a) <CELLULAR TELEPHONE DEVICE IS REVERSE>

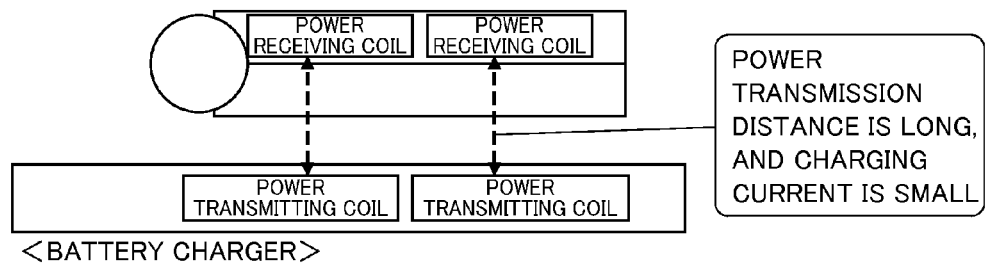

POWER TRANSMISSION DISTANCE IS LONG, AND CHARGING CURRENT IS SMALL (b) <CELLULAR TELEPHONE DEVICE HANGS OUT>

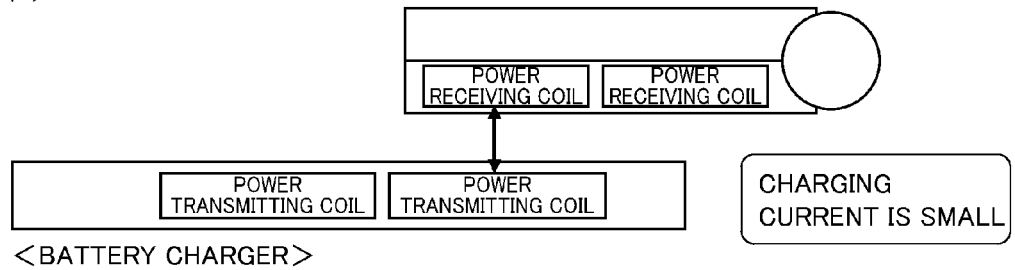

CHARGING CURRENT IS SMALL (c) <CELLULAR TELEPHONE DEVICE>

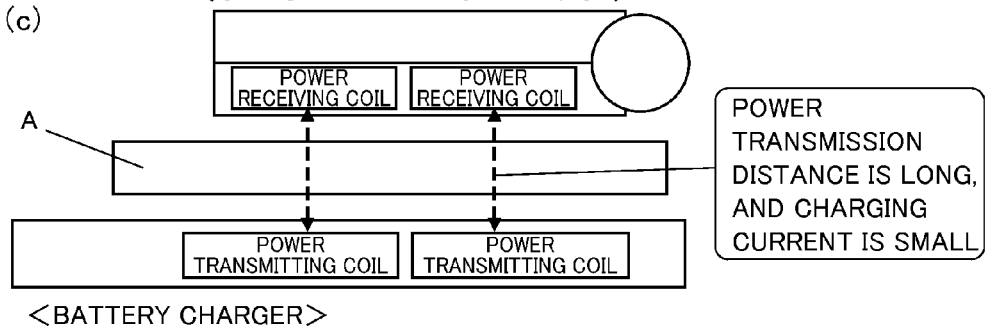

POWER TRANSMISSION DISTANCE IS LONG, AND CHARGING CURRENT IS SMALL (d) <CELLULAR TELEPHONE DEVICE>

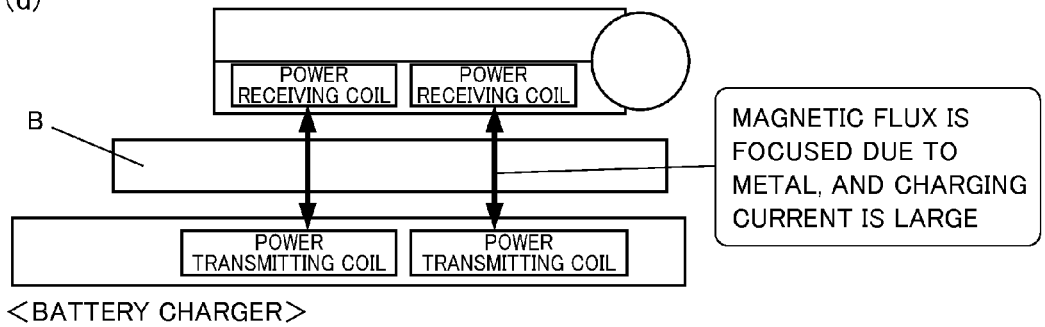

MAGNETIC FLUX IS FOCUSED DUE TO METAL, AND CHARGING CURRENT IS LARGE

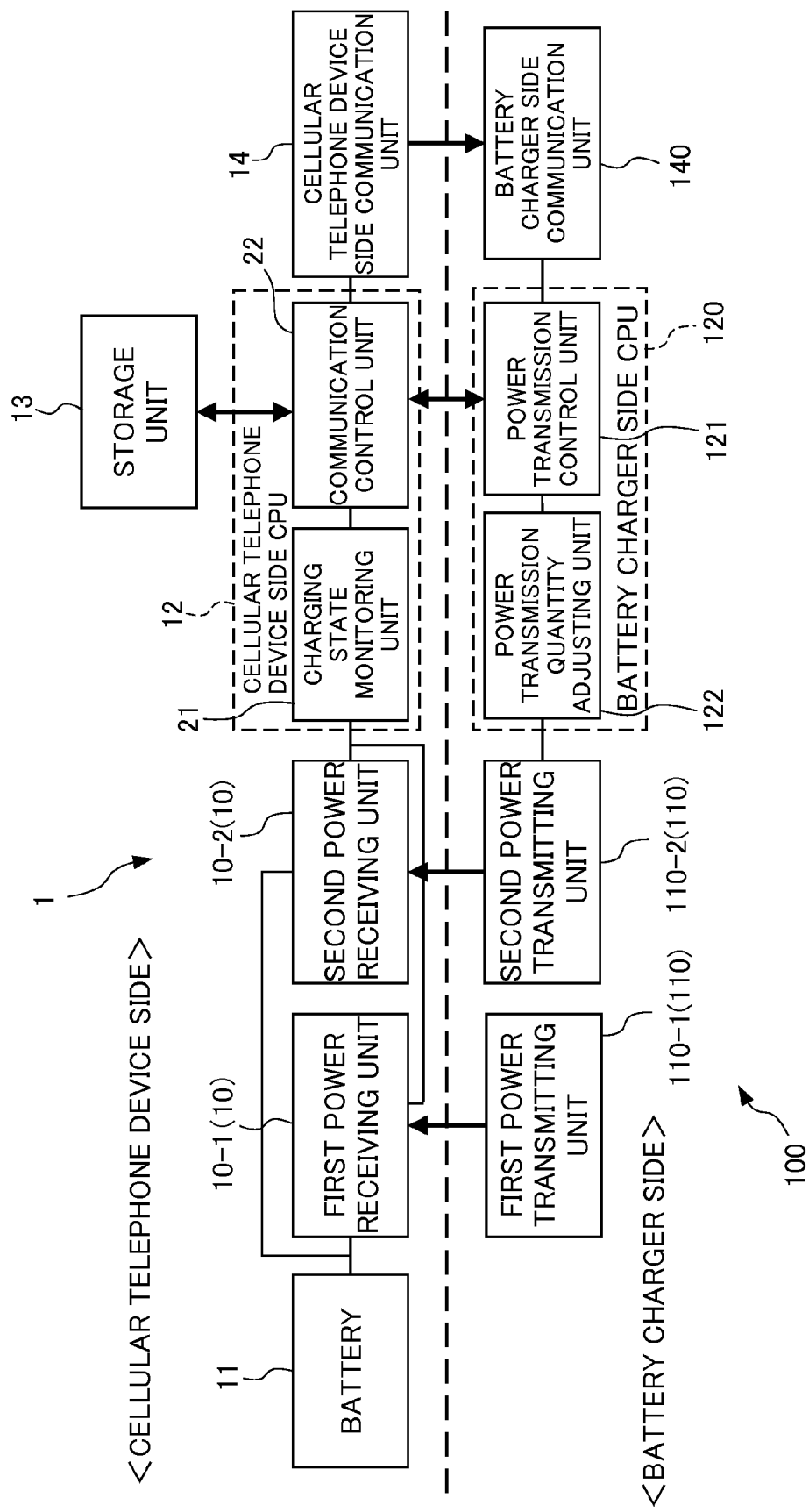

FIG. 8
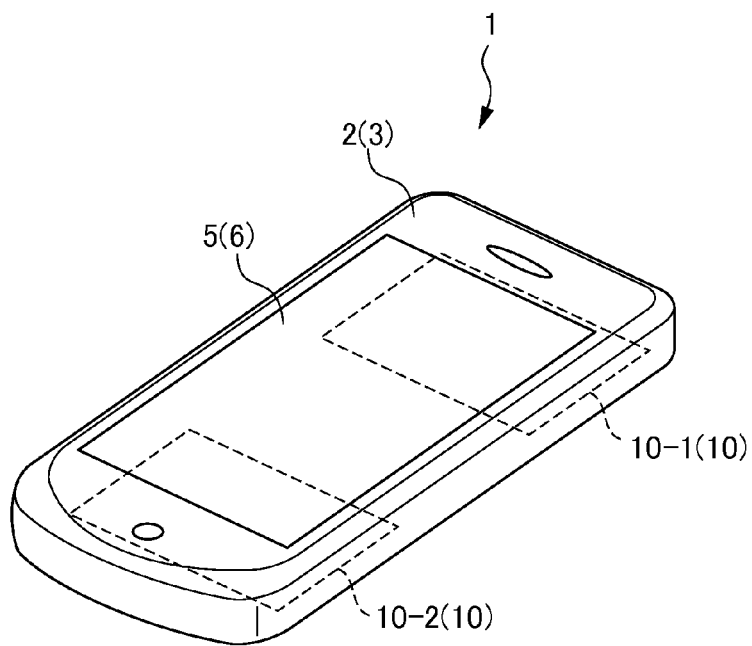
(a)
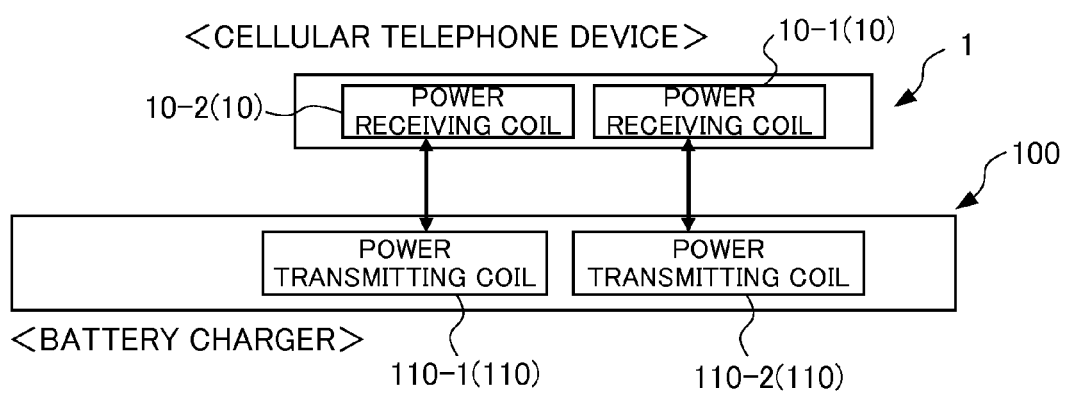
(b)

FIG. 9
(a) <CELLULAR TELEPHONE DEVICE IS REVERSE>
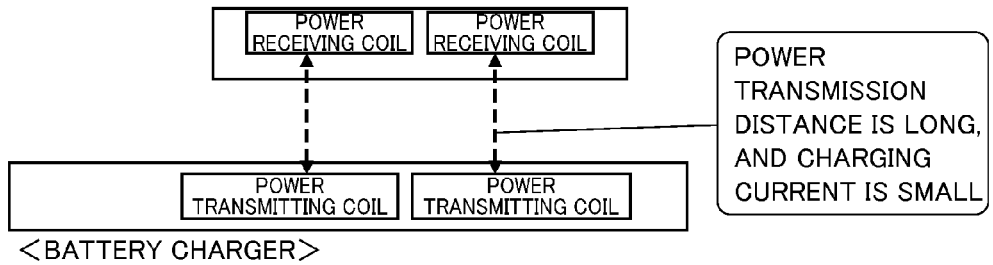
(b) <CELLULAR TELEPHONE DEVICE HANGS OUT>
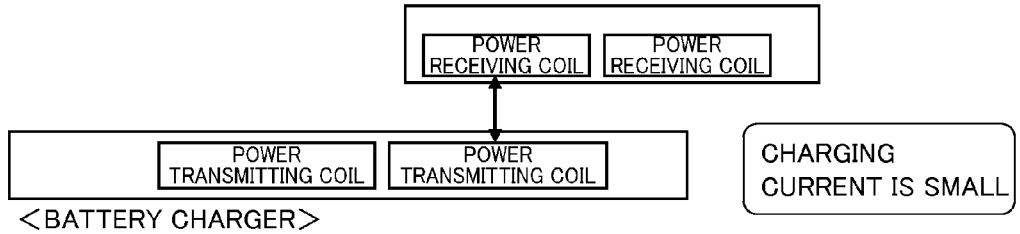
(c) <CELLULAR TELEPHONE DEVICE>
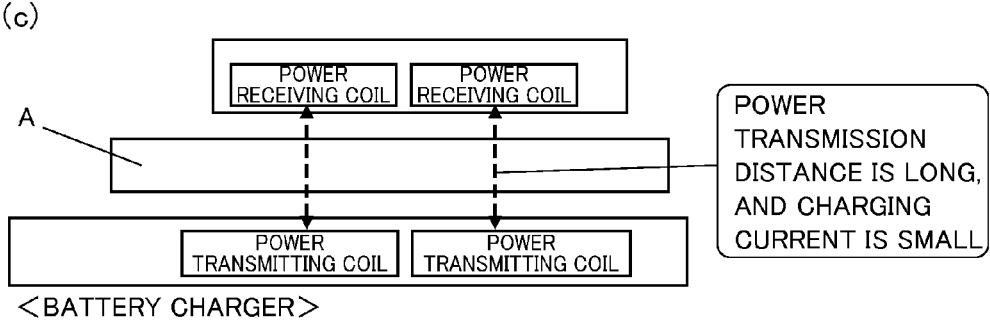
(d) <CELLULAR TELEPHONE DEVICE>
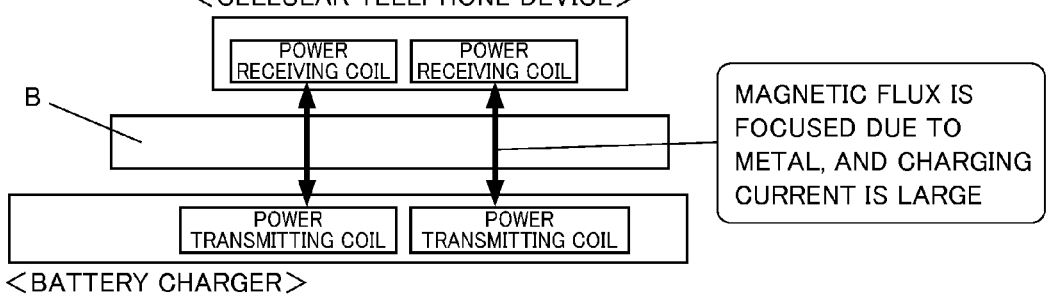

WIRELESS CHARGING SYSTEM METHOD OF CONTROLLING WIRELESS CHARGING OF A RECHARGEABLE BATTERY

This application is based on and claims the benefit of priority from Japanese Patent Application No. 2011-073662, filed on 29 Mar. 2011, the content of which is incorporated herein by reference.

BACKGROUND OF THE INVENTION

1. Field of the Invention

The present invention relates to a wireless charging system for a battery charger and a control method thereof, as well as a portable electronic device and a charging device, the wireless charging system including a portable device equipped with a rechargeable battery, and a battery charger that wirelessly charges the portable device.

2. Related Art

Conventionally, a technique (wireless charging) has been known (for example, see Patent Document 1), in which a battery charger wirelessly transmits power to a portable electronic device, and charges a rechargeable battery built in the portable electronic device.

In the technique disclosed in Patent Document 1, an acceleration sensor detects a position of a portable electronic device placed on a battery charger, and notification is provided in a case in which normal charging is not performed in such a position. Through the notification, a user recognizes that the portable electronic device is placed in a position where normal charging is not performed, and the user removes the portable electronic device to a place where normal charging is performed. As a result, normal charging is performed in the portable electronic device.

Patent Document 1: Japanese Unexamined Patent Application, Publication No. 2010-207017

SUMMARY OF THE INVENTION

Here, further improvement of wireless charging is desired.

Accordingly, an object of the present invention is to provide a wireless charging system and a control method thereof, as well as a portable electronic device and a charging device, all of which are capable of performing charging at an appropriate charging level, even in a case in which the portable electronic device is placed in a position where normal charging cannot be performed.

In order to solve the aforementioned problem, the wireless charging system according to the present invention is configured as a wireless charging system including: a charging device; and a portable electronic device that charges a secondary battery by utilizing electromagnetic waves being output from the charging device, in which the portable electronic device includes: a plurality of receiving units that receive the electromagnetic waves being output from the charging device; a charging state monitoring unit that monitors a charging state of the secondary battery; and a first communication unit that communicates with the charging device, and the charging device includes: a plurality of output units that output the electromagnetic waves; a second communication unit that communicates with the portable electronic device; and an output control unit that controls an output from the output units, based on a result of monitoring by the charging state monitoring unit.

Moreover, the wireless charging system may be configured such that the charging device further includes a switching unit, and wherein the output control unit controls that the switching unit switches an output from the output units.

In addition, the wireless charging system may be configured such that the output control unit controls that the switching unit switches sequentially the plurality of output units, and the charging state monitoring unit monitors a charging state, corresponding to how the switching unit is controlled by the output control unit, thereby identifying the output units that output electromagnetic waves.

Furthermore, the wireless charging system may be configured such that the output control unit controls that the switching unit switches sequentially the plurality of output units that periodically perform an output.

Moreover, the wireless charging system may be configured such that the output control unit controls an output from the output units, in accordance with a result of monitoring each charging state received from a plurality of the portable electronic devices.

In addition, the portable electronic device according to the present invention is configured to include: a plurality of receiving units that receive electromagnetic waves being output from a charging device; a secondary battery that is charged by utilizing the electromagnetic waves received by the receiving unit; a charging state monitoring unit that monitors a charging state of the secondary battery; and an instructing unit that gives an instruction for controlling the electromagnetic waves being output from the charging device, based on a result of monitoring by the charging state monitoring unit; and a communication unit that transmits the instruction from the instructing unit to the charging device.

Furthermore, the charging device according to the present invention is configured to include: a plurality of output units that output electromagnetic waves to a portable electronic device for charging a secondary battery of the portable electronic device; a communication unit that communicates with the portable electronic device; and an output control unit that controls the electromagnetic waves being output from the output units, based on a monitoring result of a charging state of the secondary battery received via the communication unit.

Moreover, the method for controlling the wireless charging system according to the present invention is configured as a method for controlling a wireless charging system that includes: a charging device that outputs electromagnetic waves from an output unit; and a portable electronic device that wirelessly receives the electromagnetic waves being output from the charging device for charging a secondary battery, a receiving step of receiving the electromagnetic waves being output from the charging device; a charging status monitoring step of monitoring a charging state of the secondary battery that is being charged by utilizing the electromagnetic waves received in the receiving step; and a first communication step of transmitting a signal to the charging device, based on a result of monitoring in the charging status monitoring step, and the charging device includes: an outputting step of transmitting the electromagnetic waves to the portable electronic device; a second communication step of receiving the signal transmitted in the first communication step; and an output controlling step of controlling an output by the outputting step, based on the result of monitoring in the charging status monitoring step.

According to the present invention, even in a case in which a cellular telephone device is placed in a position where normal charging cannot be performed, charging can be performed at an appropriate charging level.

BRIEF DESCRIPTION OF THE DRAWINGS

FIG. 1 is a diagram showing a wireless charging system according to an embodiment of the present invention;

FIG. 2 is a schematic diagram showing an example of patterns in which normal charging is not performed in a cellular telephone device according to a first embodiment;

FIG. 5 is a schematic diagram showing a wireless charging system according to a second embodiment;

FIG. 6 is a schematic diagram showing an example of patterns in which normal charging is not performed in a cellular telephone device according to the second embodiment;

FIG. 7 is a functional block diagram showing a functional configuration of the wireless charging system according to the second embodiment;

FIG. 8 is a perspective view showing an appearance of a cellular telephone device according to another embodiment of the present invention; and FIG. 9 is a schematic diagram showing an example of patterns in which normal charging is not performed in the cellular telephone device according to the another embodiment.

DETAILED DESCRIPTION OF THE INVENTION

Figure 3:
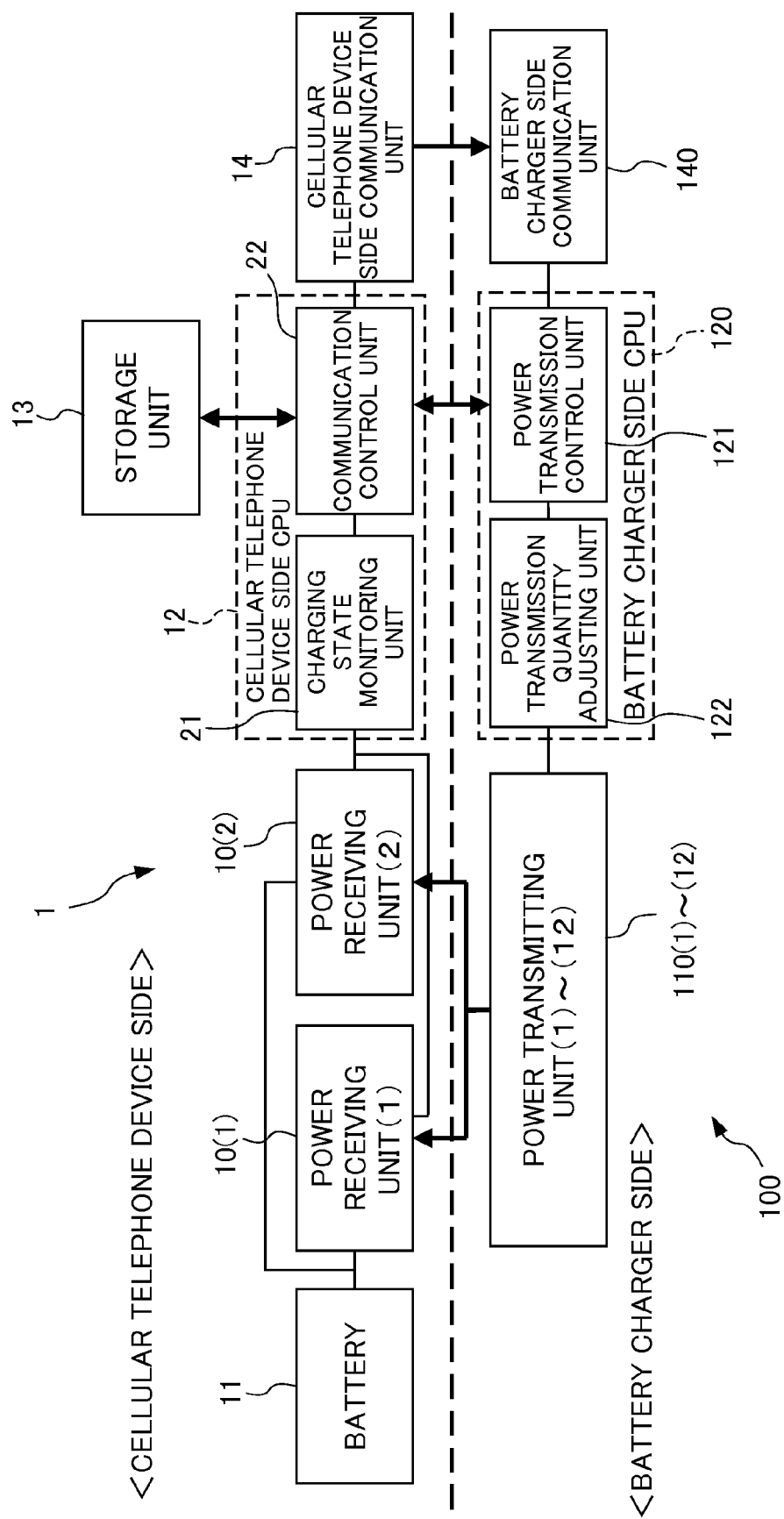
FIG. 3 is a functional block diagram showing a functional configuration of the wireless charging system according to the first embodiment.

Descriptions are provided hereinafter regarding an example of preferred embodiments of the present invention.
First Embodiment FIG. 1 is a diagram showing a wireless charging system. FIG. 1a is a view showing an external appearance of a cellular telephone device 1 and a battery charger 100. FIG. 1b is a view showing an opened state of the cellular telephone device 1. FIG. 1c is a schematic diagram showing power transmitting coils 110 of the battery charger 100, and power receiving coils 10 of the cellular telephone device 1.

As shown in FIG. 1a, the wireless charging system according to the present embodiment includes the cellular telephone device 1 and the battery charger 100. The present embodiment is configured so as to be capable of wirelessly charging the cellular telephone device 1 by placing the cellular telephone device 1 on the battery charger 100.

The cellular telephone device 1 according to the present embodiment is configured as a cellular phone of a so-called flip type, which is composed of an operation unit side body 2 including an operation unit 5, and a display unit side body 3 including a display unit 6, in which the two bodies are connected via a hinge portion 4 so as to be capable of changing the form from an opened state as shown in the FIG. 1a to a folded state that is a closed state as shown in the FIG. 1b.

As shown in FIG. 1b, the cellular telephone device 1 includes two power receiving coils 10 (a first power receiving coil 10(1) (receiving unit) and a second power receiving coil 10(2) (receiving unit)) on the operation unit side body 2 side.

The power receiving coils 10 are configured so as to be capable of receiving power from the power transmitting coils 110. The power thus received is accumulated in a battery 11 that is a secondary battery. In particular, the power receiving coils 10 can charge the secondary battery by using power generated through electromagnetic induction of electromagnetic waves thus received.

The battery charger 100 includes twelve power transmitting coils 110 (the power transmitting coils 110(1) to 110(12) (output units)). The power transmitting coils 110 are configured so as to be capable of transmitting power from a commercial power supply or the like to the power receiving coils 10. In particular, the power transmitting coils 110 have a function of outputting electromagnetic waves for wirelessly feeding power.

Moreover, as shown in FIG. 1c, the power transmitting coils 110 of the present embodiment are evenly disposed in the battery charger 100. The battery charger 100 of the present embodiment includes twelve in total of the power transmitting coils 110 disposed in four lines and three columns. It should be noted that suffixes are assigned to the power receiving coils 10 and the power transmitting coils 110 in FIGS. 1, 2 and 3 for the convenience of explanation. More specifically, suffixes (1) and (2) are assigned to the power receiving coils 10, and suffixes (1) to (12) are assigned to the power transmitting coils 110.

Here, descriptions are provided for appropriate charging in the wireless charging system. FIG. 2 is a schematic diagram showing positional relationships between the battery charger 100 and the cellular telephone device 1 in a charging state. FIG. 2a is a schematic diagram showing an ordinary charging state. FIG. 2b is a schematic diagram showing a charging state, in which the cellular telephone device 1 hangs out of the battery charger 100. FIG. 2c is a schematic diagram showing a charging state, in which the power receiving coils 10 of the cellular telephone device 1 are deviated from positions corresponding to the power transmitting coils 110 of the battery charger 100.

In the wireless charging system of the present embodiment, ordinary charging, i.e. appropriate charging, is performed in a case in which the power receiving coils 10 of the cellular telephone device 1 are placed in positions corresponding to (in the present embodiment, immediately above) the power transmitting coils 110 of the battery charger 100. In the example shown in the FIG. 2a, the power receiving coil 10(1) is placed in a position corresponding to (immediately above) the power transmitting coil 110(5), and the power receiving coil 10(2) is placed in a position corresponding to (immediately above) the power transmitting coil 110(8); as a result, appropriate charging is performed.

Moreover, the wireless charging system according to the present embodiment is configured so as to be capable of performing appropriate charging, even in a case in which the cellular telephone device 1 hangs out of the battery charger 100.

The case in which the cellular telephone device 1 hangs out of the battery charger 100 refers to a case in which power transmission from the power transmitting coils 110 is disconnected in any of the power receiving coils 10(1) or 10(2) (a case of being deviated from a power transmission range). In this case, in general, since a quantity of power transmitted is lower than a predetermined value (a necessary value), appropriate charging cannot be performed.

The example shown in FIG. 2b illustrates a case in which the cellular telephone device 1 hangs out of the battery charger 100, and only the power receiving coil 10(1) is placed in a position corresponding to (immediately above) the power transmitting coil 110(11).

In addition, the wireless charging system according to the present embodiment is configured so as to be capable of performing appropriate charging, even in a case in which any of the power receiving coils 10 of the cellular telephone device 1 is deviated from a position corresponding to any of the power transmitting coils 110 of the battery charger 100, and thus is placed over the plurality of power transmitting coils 110.

In a case in which any of the power receiving coils 10 of the cellular telephone device 1 is placed over the plurality of power transmitting coils 110 of the battery charger 100, since the power is supplied from the plurality of power transmitting coils 110, the power receiving coil 10 receives excessive power. In this case, the power is wasted, and the battery 11 will rapidly deteriorate.

The example shown in FIG. 2c illustrates a case in which the power receiving coil 10(1) is positioned over the power transmitting coils 110(4), 110(5), 110(7) and 110(8), and the power receiving coil 10(2) is positioned over the power transmitting coils 110(7), 110(8), 110(10) and 110(11).

Next, with reference to FIG. 3, descriptions are provided for a configuration of the cellular telephone device 1 and a configuration of the battery charger 100, for implementing the aforementioned function. FIG. 3 is a functional block diagram showing the configuration of the cellular telephone device 1.

The configuration of the cellular telephone device 1 is described first, and the configuration of the battery charger 100 is described next.

As shown in FIG. 3, the cellular telephone device 1 includes: the battery 11; the power receiving units 10(1) and 10(2) being the power receiving coils; a cellular telephone device side CPU 12; a storage unit 13; and a cellular telephone device side communication unit 14 (a first communication unit).

The battery 11 is a rechargeable secondary battery.

The power receiving units 10 are configured with coils, and in a state of being proximate to power transmitting units 110 (to be described later), an electromotive force is generated based on magnetic flux being output from the power transmitting coils 110.

Furthermore, in the present embodiment, the power receiving units 10 are configured with two power receiving units 10, i.e. the power receiving unit 10(1) and the power receiving unit 10(2).

Appropriate charging refers to charging that is performed by the power receiving units 10 to receive power, in a case in which the distance between the power receiving units 10 and the power transmitting units 110 is appropriate, and the quantity of power transmitted is appropriate.

In the present embodiment, as shown in FIG. 2a, appropriate charging is performed by placing the cellular telephone device 1 on the battery charger 100, such that the power receiving units 10 are positioned immediately above and proximately to the power transmitting units 110.

In particular, the cellular telephone device side CPU 12 has a charging state monitoring unit 21 and a communication control unit 22 (an instructing unit).

The charging state monitoring unit 21 detects presence and a quantity of power received by the power receiving units 10.

More specifically, based on the detected presence and quantity of power received by the power receiving units 10, the charging state monitoring unit 21 determines whether appropriate (adequate) charging is being performed. Moreover, the charging state monitoring unit 21 determines how much quantity of power received is required for performing charging such that the quantity of power received by the power receiving units 10 is appropriate. For example, the charging state monitoring unit 21 determines whether the detected quantity of power (electric current value) received by the power receiving units 10 reaches a predetermined value.

In a case in which the quantity of power received is too small to perform appropriate charging, the charging state monitoring unit 21 determines how much quantity of power received should be increased for enabling appropriate charging. In addition, in a case in which the quantity of power received is too large to perform appropriate charging, the charging state monitoring unit 21 determines how much quantity of power received should be decreased for enabling appropriate charging.

It should be noted that such determination of appropriate charging is performed by detecting presence and quantity of power received as well as increase in a charged level, and by determining whether the quantity of power received and the increase in the charged level are at least predetermined values. Furthermore, determination of appropriate charging is not limited thereto, and determination may be made according to whether the quantity of power received is balanced with the quantity of power transmitted from the power transmitting units 110.

Based on a result of determination by the charging state monitoring unit 21, in a case in which the quantity of power received is too small, the communication control unit 22 controls the power transmitting units 110 to increase the quantity of power transmitted. For example, in response to an instruction from the communication control unit 22, the cellular telephone device side communication unit 14 transmits an instruction signal for increasing the quantity of power transmitted from the power transmitting units 110 (an instruction signal for increasing the electric current of the power transmitting coils) to the battery charger 100.

Moreover, based on a result of determination by the charging state monitoring unit 21, in a case in which the quantity of power received is too large, the communication control unit 22 controls the power transmitting units 110 to decrease the quantity of power transmitted. For example, in response to an instruction from the communication control unit 22, the cellular telephone device side communication unit 14 transmits an instruction signal for decreasing the quantity of power transmitted from the power transmitting units 110 (an instruction signal for decreasing the electric current of the power transmitting coils) to the battery charger 100.

The cellular telephone device side communication unit 14 performs transmission and reception of signals with a battery charger side communication unit 140 (to be described later).

The storage unit 13 stores data such as a charged level of the battery 11, the data being used for determination by the charging state monitoring unit 21.

Next, descriptions are provided for a configuration of the battery charger 100.

As shown in FIG. 3, the battery charger 100 has: the power transmitting units 110(1) to 110(12) being the power transmitting coils; a battery charger side CPU 120; and the battery charger side communication unit 140 (a second communication unit).

The power transmitting units 110 are configured with coils, through which an electric current flows to generate magnetic flux.

In particular, the battery charger side CPU 120 has a power transmission control unit 121 and a power transmission quantity adjusting unit 122 (a switching unit).

Based on a signal received by the battery charger side communication unit 140, the power transmission control unit 121 controls the power transmission quantity adjusting unit 122 to adjust the quantity of power transmitted from the power transmitting units 110.

The power transmission quantity adjusting unit 122 individually switches the quantity of power transmitted from the power transmitting units 110(1) to 110(12). The power transmission quantity adjusting unit 122 sequentially switches the power transmitting units 110(1) to 110(12). The charging state monitoring unit 21 can determine which of the power receiving coils 10 of the cellular telephone device 1 is above which of the power transmitting coils 110.

In addition, since the power transmission quantity adjusting unit 122 periodically switches the power transmitting units 110(1) to 110(12), it is possible to manage a case in which the cellular telephone device 1 is newly placed, and also a case in which the position of the cellular telephone device 1 is displaced.

The battery charger side communication unit 140 performs transmission and reception of signals with the cellular telephone device side communication unit 14.

The wireless charging system configured as described above includes: the battery charger 100 having a function of outputting electromagnetic waves for wirelessly feeding power, and the cellular telephone device 1 having a function of charging the battery 11 by receiving the electromagnetic waves being output from the battery charger 100.

Based on a state of power received by the power receiving units 10 of the cellular telephone device 1, the battery charger 100 can adjust the quantity of power transmitted. As a result, for example, in a case in which the quantity of power received by the power receiving units 10 of the cellular telephone device 1 is too small due to deviation or the like of the cellular telephone device 1 from a predetermined position, the wireless charging system increases the quantity of power transmitted, thereby making it possible to reliably perform appropriate charging of the battery 11 of the cellular telephone device 1. On the other hand, for example, in a case in which the quantity of power received by the power receiving units 10 of the cellular telephone device 1 is too large due to any of the power receiving units 10 of the cellular telephone device 1 being placed to extend over the plurality of power transmitting units 110 of the battery charger 100, the wireless charging system decreases the quantity of power transmitted, thereby making it possible to suppress consumption of the power, and suppress deterioration of the battery 11.

The power transmission control unit 121 controls the power transmission quantity adjusting unit 122 such that the power transmission from the power transmitting units 110(1) to 110(12) is switched. As a result, the battery charger 100 can perform charging through only the power transmitting units 110, from which the power is being received by the power receiving units 10 of the cellular telephone device 1; therefore, it is possible to suppress unnecessary consumption of the power.

Furthermore, the power transmission control unit 121 controls the power transmission quantity adjusting unit 122 such that the power transmission from the power transmitting units 110(1) to 110(12) is sequentially switched. In the wireless charging system, the power transmission from the power transmitting units 110(1) to 110(12) is sequentially switched, and based on a result of receiving power by the power receiving units 10 when switching the power transmission, relative positions of the power receiving units 10 and the power transmitting units 110(1) to 110(12) are identified; in other words, it is possible to identify the position of the cellular telephone device 1 placed on the battery charger 100.

Moreover, the power transmission control unit 121 controls the power transmission quantity adjusting unit 122 such that the power transmission from the power transmitting units 110(1) to 110(12) is switched at predetermined timing. As a result, in a case in which the cellular telephone device 1 is newly placed on the battery charger 100, and in a case in which the position of the already placed cellular telephone device 1 is displaced, the wireless charging system can identify such positions of the cellular telephone device 1. In this case, by transmitting power from the power transmitting units 110(1) to 110(12) based on such a new state of charging, the wireless charging system can reliably charge the cellular telephone device 1, and suppress deterioration of the battery 11 and wasteful consumption of the power.

In addition, in the wireless charging system, in a case in which a plurality of the cellular telephone devices 1 are placed on the battery charger 100, the power transmission control unit 121 controls the power transmitting units 110(1) to 110(12) to output power in accordance with each result of monitoring the charging states received from the cellular telephone devices 1. For example, the wireless charging system may control adjustment of the quantity of power transmitted from the power transmitting units 110(1) to 110(12), such that one of the cellular telephone devices 1 having the lowest quantity of power received among the plurality of cellular telephone devices 1 intensively receives power until reaching a desired quantity of power received.

Furthermore, the wireless charging system may control the switching of the power transmission from the power transmitting units 110(1) to 110(12), such that the cellular telephone device 1 having a low charged level among the plurality of cellular telephone devices 1 is intensively charged.

Moreover, the wireless charging system can be configured to determine that the cellular telephone device 1 being preferentially charged has reached a predetermined charged state, and then transmit power to the other cellular telephone devices 1. With such a configuration, the wireless charging system can actively and preferentially charge the cellular telephone device 1 that is in an unfavorable charging state (having a low quantity of power received, a low charged level, and the like).

In addition, in a case in which the plurality of cellular telephone devices 1 are positioned above a particular one of the power transmitting units 110, and the plurality of cellular telephone devices 1 are receiving power from the particular one of the power transmitting units 110, the wireless charging system controls the power transmission from the power transmitting units 110 such that any of the cellular telephone device 1 being in an unfavorable charging state (having a low quantity of power received, a low charged level, and the like) is preferentially charged.

Furthermore, in a case in which the wireless charging system determines that the cellular telephone device 1 being preferentially charged has reached a predetermined charged state, the wireless charging system intensively charges the cellular telephone device 1 in a charging state that is secondly unfavorable.

Figure 4:
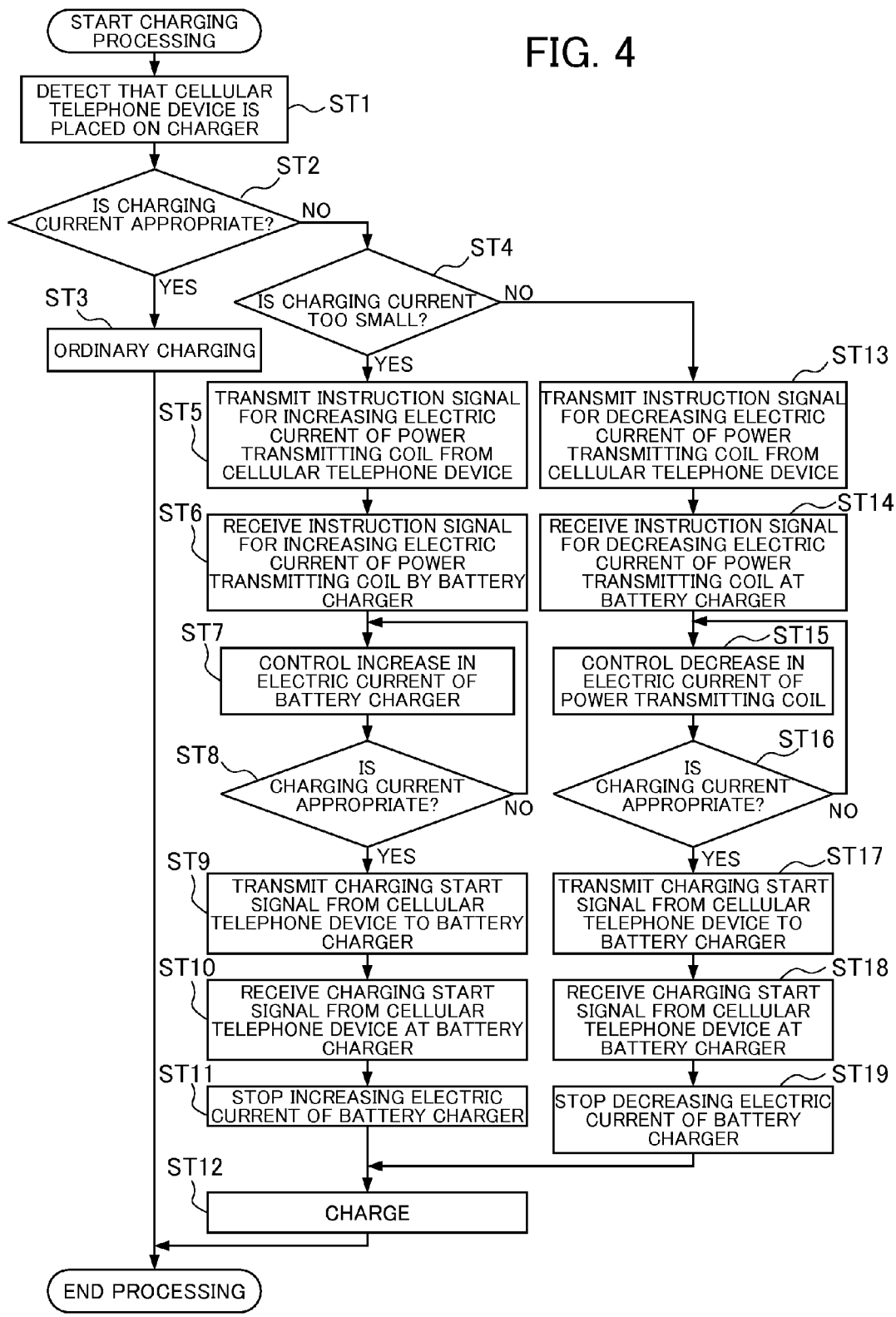
FIG. 4 is a flow chart showing operations of charging processing of the wireless charging system according to the first embodiment.

Next, with reference to FIG. 4, descriptions are provided for charging processing performed by the wireless charging system. FIG. 4 is a flow chart showing a flow of the charging processing performed by the wireless charging system.

In Step ST1, the charging state monitoring unit 21 detects that the cellular telephone device 1 is placed on the battery charger 100. More specifically, by detecting power received by the power receiving units 10, the charging state monitoring unit 21 detects that the cellular telephone device 1 is placed on the battery charger 100. In doing so, the power transmission control unit 121 controls the power transmission quantity adjusting unit 122 such that the power transmission from the power transmitting units 110(1) to 110(12) is sequentially switched. As a result, the charging state monitoring unit 21 can determine which of the power receiving units 10(1) and 10(2) of the cellular telephone device 1 receives power from which of the power transmitting units 110(1) to 110(12) of the battery charger 100, and can detect the position of the cellular telephone device 1 on the battery charger 100.

Moreover, the power transmission control unit 121 controls the power transmission quantity adjusting unit 122 such that the power transmission from the power transmitting units 110(1) to 110(12) is sequentially switched at predetermined timing on a periodical basis. As a result, in a case in which the cellular telephone device 1 is newly placed on the battery charger 100, or in a case in which the position of the already placed cellular telephone device 1 is displaced, it is possible to identify such positions of the cellular telephone device 1.

In Step ST2, the charging state monitoring unit 21 determines whether the charging is appropriate. More specifically, the charging state monitoring unit 21 detects a quantity of power (an electric current value) received by the power receiving units 10. In addition, the charging state monitoring unit 21 determines whether the detected quantity of power (the electric current value) received by the power receiving units 10 reaches a predetermined value.

In a case in which the detected quantity of power (the electric current value) received by the power receiving units 10 reaches a predetermined value (YES), the processing advances to Step ST3. On the other hand, in a case in which the detected quantity of power (the electric current value) received by the power receiving units 10 does not reach the predetermined value (NO), the processing advances to Step ST4.

In Step ST3, the cellular telephone device 1 performs ordinary charging. More specifically, as shown in FIG. 2*a*, the cellular telephone device 1 is in a state where the power receiving units 10 are placed immediately above the power transmitting units 110; therefore, the power is transmitted without adjusting the quantity of power transmitted. As a result, the battery 11 is charged with an appropriate quantity of power received.

In Step ST4, the charging state monitoring unit 21 determines whether the charging current is too small. In a case in which the charging current is too small (YES), the processing advances to Step ST5. In a case in which the charging current is too large (NO), the processing advances to Step ST13.

In Step ST5, the cellular telephone device side communication unit 14 transmits an instruction signal for increasing the electric current of the power transmitting coils to the battery charger 100.

In Step ST6, the battery charger side communication unit 140 receives the instruction signal for increasing the electric current of the power transmitting coils.

In Step ST7, the power transmission quantity adjusting unit 122 performs control so as to increase the electric current being supplied to the power transmitting coils 110.

In Step ST8, the charging state monitoring unit 21 determines whether the charging is appropriate. More specifically, the charging state monitoring unit 21 determines whether the detected quantity of power (the electric current value) received by the power receiving units 10 reaches a predetermined value.

In a case in which such detected quantity of power (the electric current value) received by the power receiving units 10 reaches a predetermined value (YES), the processing advances to Step ST9. On the other hand, in a case in which the detected quantity of power (the electric current value) received by the power receiving units 10 does not reach the predetermined value (NO), the processing returns to Step ST7.

In Step ST9, the cellular telephone device side communication unit 14 transmits a charging start signal. More specifically, since the charging current was adjusted be appropriate, the communication control unit 22 instructs the cellular telephone device side communication unit 14 to transmit a signal for starting charging (the charging start signal) to the battery charger 100. As a result, the cellular telephone device side communication unit 14 transmits the charging start signal to the battery charger 100.

In Step ST10, the battery charger side communication unit 140 receives the charging start signal.

In Step ST11, the power transmission quantity adjusting unit 122 stops increasing the electric current. More specifically, by receiving the charging start signal, the power transmission quantity adjusting unit 122 determines that the charging current was adjusted to be appropriate, stops increasing the quantity of power transmitted, and controls the power transmitting units 110 not to vary the quantity of power transmitted.

In Step ST12, the battery 11 is charged. Subsequently, the processing is terminated.

In Step ST13, in response to an instruction from the communication control unit 22, the cellular telephone device side communication unit 14 transmits an instruction signal for decreasing the quantity of power transmitted from the power transmitting units 110 (an instruction signal for decreasing the electric current of the power transmitting coils) to the battery charger 100.

In Step ST14, the battery charger side communication unit 140 receives the instruction signal for decreasing the electric current of the power transmitting coils.

In Step ST15, the power transmission quantity adjusting unit 122 performs control so as to decrease the electric current being supplied to the power transmitting coils 110.

In Step ST16, the charging state monitoring unit 21 determines whether the charging is appropriate. More specifically, the charging state monitoring unit 21 determines whether the detected quantity of power (an electric current value) received by the power receiving units 10 reaches a predetermined value.

In a case in which the detected quantity of power (the electric current value) received by the power receiving units 10 reaches a predetermined value (YES), the processing advances to Step ST17. On the other hand, in a case in which the detected quantity of power (the electric current value) received by the power receiving units 10 does not reach the predetermined value (NO), the processing returns to Step ST15.

In Step ST17, the cellular telephone device side communication unit 14 transmits a charging start signal. More specifically, since the charging current was adjusted to be appropriate, the communication control unit 22 instructs the cellular telephone device side communication unit 14 to transmit a signal for starting charging (the charging start signal) to the battery charger 100. As a result, the cellular telephone device side communication unit 14 transmits the charging start signal to the battery charger 100.

In Step ST18, the battery charger side communication unit 140 receives the charging start signal.

In Step ST19, the power transmission quantity adjusting unit 122 stops decreasing the electric current. More specifically, by receiving the charging start signal, the power transmission quantity adjusting unit 122 determines that the charging current was adjusted to be appropriate, stops decreasing the quantity of power transmitted, and controls the power transmitting units 110 not to vary the quantity of power transmitted.

As described above, the battery 11 is charged in Step ST12. Subsequently, the processing is terminated.

In this way, with the wireless charging system, the cellular telephone device 1 can be charged at an appropriate charging level.

Second Embodiment

Since a basic structure and a functional configuration of a wireless charging system according to a second embodiment is the same as those of the wireless charging system according to the first embodiment, detailed descriptions thereof are omitted.

FIG. 5 is a conceptual diagram showing the wireless charging system according to the second embodiment. FIG. 5a is a view showing an external appearance of a cellular telephone device 1 and a battery charger 100. FIG. 5b is a view showing an opened state of the cellular telephone device 1. FIG. 5c is a schematic diagram showing charging in an appropriate position.

As shown in FIG. 5a, the wireless charging system of the present embodiment includes the cellular telephone device 1 and the battery charger 100. The present embodiment is configured so as to be capable of charging the cellular telephone device 1 by placing the cellular telephone device 1 on the battery charger 100.

Moreover, the wireless charging in the present embodiment employs a method utilizing electromagnetic induction, i.e. a so-called electromagnetic induction method, in which an electric current flows through one of two adjacent coils to generate magnetic flux, which generates an electromotive force in another one of the adjacent coils.

The cellular telephone device 1 in the present embodiment is configured as a cellular phone of a so-called flip type, which is composed of an operation unit side body 2 including an operation unit 5, and a display unit side body 3 including a display unit 6, in which the two bodies are connected via a hinge portion 4 so as to be capable of changing from a closed state to an opened state, or from the opened state to the closed state. It should be noted that the cellular telephone device 1 is not limited to the flip type, and the cellular telephone device 1 may be of a straight type or a slider type.

As shown in FIG. 5b, the cellular telephone device 1 with such a configuration includes two power receiving coils 10 (a first power receiving coil 10-1 and a second power receiving coil 10-2) on the operation unit side body 2 side. The power receiving coils 10 are configured to be capable of receiving power from the power transmitting coils 110, and the power thus received is accumulated in the battery 11 that is a secondary battery.

The battery charger 100 includes two power transmitting coils 110 (a first power transmitting coil 110-1 and a second power transmitting coil 110-2) corresponding to the power receiving coils 10 of the cellular telephone device 1. The power transmitting coils 110 are configured so as to be capable of transmitting power from a commercial power supply or the like to the power receiving coils 10.

Here, descriptions are provided for appropriate charging in the wireless charging system.

As shown in FIG. 5c, the appropriate charging refers to charging that is performed in a state where the power receiving coils 10-1 and 10-2 of the cellular telephone device 1 are placed in positions corresponding to the power transmitting coils 110 (immediately above the power transmitting coils 110, in the present embodiment).

Next, descriptions are provided for a case in which the appropriate charging is not performed in the wireless charging system.

As shown in FIG. 6a, in the wireless charging system, when the cellular telephone device 1 is placed such that the display unit side body 3 faces the battery charger 100, the distance between the power transmitting coils 110 and the power receiving coils 10 is increased; as a result, appropriate power receiving is not performed. In other words, as a result of increasing the distance between the power receiving coils 10 and the power transmitting coils 110, the distance for power transmission is increased, and the charging current of the power receiving coils 10 is decreased. As a result, appropriate charging is not performed.

As shown in FIG. 6b, in the wireless charging system, in a case in which the cellular telephone device 1 is deviated from a regular position (FIG. 5c), and the power receiving coils 10 hang out of the battery charger 100, appropriate power receiving cannot be performed. In other words, due to any one of the power receiving coils 10 not receiving power, the charging current of the power receiving coils 10 is decreased. As a result, appropriate charging is not performed.

In the wireless charging system, for example, as shown in FIG. 6c, in a case in which the power is transmitted from the power transmitting coils 110 in a state where an insulator A is inserted between the cellular telephone device 1 and the battery charger 100, the distance between the power transmitting coils 110 and the power receiving coils 10 is increased by a thickness of the insulator A, and the power receiving coils 10 cannot receive power at an appropriate charging level.

In the wireless charging system, for example, as shown in FIG. 6d, in a case in which the power is transmitted from the power transmitting coils 110 in a state where a metallic object B is inserted between the cellular telephone device 1 and the battery charger 100, the charging state is that "the magnetic flux is focused due to the metal, and the charging current is large". As a result, appropriate charging is not performed.

The present embodiment is configured to perform appropriate charging, even in a case in which the charging is performed in the charging patterns as described above.

Next, descriptions are provided for a configuration of the cellular telephone device 1 and a configuration of the battery charger 100 with reference to FIG. 6. FIG. 7 is a functional block diagram showing the configuration of the cellular telephone device 1.

The configuration of the cellular telephone device 1 is described first, and the configuration of the battery charger 100 is described next.

As shown in FIG. 7, the cellular telephone device 1 includes: the battery 11; the first power receiving unit 10-1 as the first power receiving coil; the second power receiving unit 10-2 as the second power receiving coil; the cellular telephone device side CPU 12; the storage unit 13; and the cellular telephone device side communication unit 14 (the first communication unit).

The battery 11 is a rechargeable secondary battery.

In a state of being proximate to the power transmitting units 110 (the power transmitting coils 110), the power receiving units 10 as coils generate an electromotive force, which is mediated by magnetic flux generated from an electric current flowing through the power transmitting coils 110.

Moreover, in the present embodiment, the power receiving units 10 are configured with the first power receiving unit 10-1 and the second power receiving unit 10-2.

The appropriate charging refers to charging that is performed by the power receiving units 10 to receive power, in a case in which a distance between the power receiving units 10 and the power transmitting units 110 is appropriate, and a quantity of power transmitted is appropriate.

In the present embodiment, as shown in FIG. 5c, appropriate charging is performed by placing the cellular telephone device 1 on the battery charger 100, such that the power receiving units 10 are positioned immediately above and proximately to the power transmitting units 110.

The cellular telephone device side CPU 12 has the charging state monitoring unit 21 and the communication control unit 22 (the instructing unit).

The charging state monitoring unit 21 detects presence and quantity of power received by the power receiving units 10, and determines whether appropriate charging is being performed. In addition, the charging state monitoring unit 21 determines how much quantity of power received is required for performing charging such that the quantity of power received by the power receiving units 10 is appropriate. More specifically, in a case in which the quantity of power received is too small to perform appropriate charging, the charging state monitoring unit 21 determines how much quantity of power received should be increased for enabling appropriate charging. Furthermore, in a case in which the quantity of power received is too large to perform appropriate charging, the charging state monitoring unit 21 determines how much quantity of power received should be decreased for enabling appropriate charging.

Based on a result of determination by the charging state monitoring unit 21, in a case in which the quantity of power received is too small, the communication control unit 22 controls the power transmitting units 110 to increase the quantity of power transmitted. For example, in response to an instruction from the communication control unit 22, the cellular telephone device side communication unit 14 transmits an instruction signal for increasing the quantity of power transmitted from the power transmitting units 110 (an instruction signal for increasing the electric current of the power transmitting coils) to the battery charger 100.

Moreover, based on a result of determination by the charging state monitoring unit 21, in a case in which the quantity of power received is too large, the communication control unit 22 controls the power transmitting units 110 to decrease the quantity of power transmitted. For example, in response to an instruction from the communication control unit 22, the cellular telephone device side communication unit 14 transmits an instruction signal for decreasing the quantity of power transmitted from the power transmitting units 110 (an instruction signal for decreasing the electric current of the power transmitting coils) to the battery charger 100.

The cellular telephone device side communication unit 14 performs transmission and reception of signals with the battery charger side communication unit 140.

The storage unit 13 stores data such as a charged level of the battery 11, the data being used for determination by the charging state monitoring unit 21.

Next, descriptions are provided for the configuration of the battery charger 100.

As shown in FIG. 7, the battery charger 100 includes: the power transmitting units 110; the battery charger side CPU 120; and the battery charger side communication unit 140.

The power transmitting units 110 are coils, through which an electric current flows to generate magnetic flux, in a state of being proximate to the power receiving units 10 (the power receiving coils 10). In addition, the power transmitting units 110 are configured with the first power transmitting unit 110-1 and the second power transmitting unit 110-2, corresponding to the first power receiving unit 10-1 and the second power receiving unit 10-2.

The battery charger side CPU 120 includes the power transmission control unit 121 (execution unit) and the power transmission quantity adjusting unit 122.

Based on a signal received by the battery charger side communication unit 140 (an instruction signal for increasing or decreasing the electric current of the power transmitting coils), the power transmission control unit 121 controls the power transmission quantity adjusting unit 122 to adjust the quantity of power transmitted from the power transmitting units 110.

The battery charger side communication unit 140 performs transmission and reception of signals with the cellular telephone device side communication unit 14.

Based on the quantity of power received by the power receiving units 10 of the cellular telephone device 1 monitored by the charging state monitoring unit 21, the wireless charging system configured as described above transmits an instruction signal for increasing or decreasing the electric current of the power transmitting coils to the battery charger 100. Based on the signal received, the power transmission control unit 121 controls the power transmission quantity adjusting unit 122 to adjust the quantity of power transmitted from the power transmitting units 110.

Therefore, even in a case in which the cellular telephone device 1 is placed in a position where normal charging cannot be performed, the wireless charging system can perform charging at an appropriate charging level.

Next, descriptions are provided for an operation in a case in which appropriate charging is not being performed, as shown in FIG. 6a. Based on a result of monitoring by the charging state monitoring unit 21, the cellular telephone device 1 determines that the quantity of power received is too small to perform appropriate charging in the first power receiving coil 10-1 and the second power receiving coil 10-2. The cellular telephone device side communication unit 14 transmits an instruction signal for increasing the electric current of the power transmitting coils. Based on the received instruction signal for increasing the electric current of the power transmitting coils, the power transmission control unit 121 controls the power transmission quantity adjusting unit 122 to increase the quantity of power transmitted from the first power transmitting unit 110-1 and the second power transmitting unit 110-2.

As a result, the cellular telephone device 1 can receive a quantity of power, with which appropriate charging can be performed.

Furthermore, descriptions are provided for an operation in a case in which appropriate charging is not being performed, as shown in FIG. 6b. Based on a result of monitoring by the charging state monitoring unit 21, the cellular telephone device 1 determines that power is not received by the second power receiving coil 10-2, and the quantity of power received by only the first power receiving coil 10-1 is too small to perform appropriate charging. The cellular telephone device side communication unit 14 transmits an instruction signal for increasing the electric current of the power transmitting coils. Based on the received instruction signal for increasing the electric current of the power transmitting coils, the power transmission control unit 121 controls the power transmission quantity adjusting unit 122 to increase the quantity of power transmitted from the second power transmitting unit 110-2.

As a result, the cellular telephone device 1 can receive a quantity of power, with which appropriate charging can be performed.

Moreover, descriptions are provided for an operation in a case in which appropriate charging is not being performed, as shown in FIG. 6cb. Based on a result of monitoring by the charging state monitoring unit 21, the cellular telephone device 1 determines that there is an insulator between the cellular telephone device 1 and the battery charger 100, and that the quantity of power received is too small to perform appropriate charging. The cellular telephone device side communication unit 14 transmits an instruction signal for increasing the electric current of the power transmitting coils. Based on the received instruction signal for increasing the electric current of the power transmitting coils, the power transmission control unit 121 controls the power transmission quantity adjusting unit 122 to increase the quantity of power transmitted from the first power transmitting unit 110-1 and the second power transmitting unit 110-2.

As a result, the cellular telephone device 1 can receive a quantity of power, with which appropriate charging can be performed.

In addition, descriptions are provided for an operation in a case in which appropriate charging is not being performed, as shown in FIG. 6d. Based on a result of monitoring by the charging state monitoring unit 21, the cellular telephone device 1 determines that there is a metallic object between the cellular telephone device 1 and the battery charger 100, resulting in excessive power received due to magnetic flux being focused by the metallic object, and the quantity of power received is too large to perform appropriate charging. The cellular telephone device side communication unit 14 transmits an instruction signal for decreasing the electric current of the power transmitting coils. Based on the received instruction signal for decreasing the electric current of the power transmitting coils, the power transmission control unit 121 controls the power transmission quantity adjusting unit 122 to decrease the quantity of power transmitted from the first power transmitting unit 110-1 and the second power transmitting unit 110-2.

As a result, the cellular telephone device 1 can receive a quantity of power, with which appropriate charging can be performed.

Furthermore, based on a result of monitoring by the charging state monitoring unit 21, for example, in a case in which the quantity of power received by the first power receiving unit 10 is too small, the display unit 6 (a notification unit) displays notification for removing the cellular telephone device 1 to a position in which the quantity of power received by the first power receiving unit 10 is increased.

As a result, the user can recognize that appropriate charging is not being performed, and which position the cellular telephone device 1 should be removed to for enabling appropriate charging.

Another Embodiment

Next, descriptions are provided for another embodiment with reference to FIGS. 8 and 9. FIG. 8 is a perspective view showing an appearance of a cellular telephone device 1 according to the another embodiment of the present invention.

FIG. 9 is a schematic diagram showing an example of patterns in which normal charging is not performed in the cellular telephone device 1 of the another embodiment. It should be noted that portions serving functions similar to those in the first embodiment are assigned with the same reference numerals, and descriptions thereof are omitted as appropriate.

Although the cellular telephone device 1 of a flip type has been described in the aforementioned embodiments, cellular telephone devices of a straight type and of a smart phone type are described in the present embodiment. It should be noted that, when wireless charging is employed for charging the cellular telephone device of the smart phone type that is likely to be carried in a case or the like, charging can be easily performed without taking out the cellular telephone device from the case, but a quantity of power received may be decreased as compared to one without a case. The wireless charging system according to the present invention is preferably operated in such a case.

The power receiving coils 10 are disposed in the vicinity of a rear face, and inside, of the cellular telephone device 1, a display unit being disposed on a front surface thereof.

Accordingly, when the cellular telephone device 1 is wirelessly charged, the quantity of power received by the power receiving units 10 is different between: a case in which the cellular telephone device 1 is placed on the battery charger 100 such that the rear face thereof faces the battery charger 100 side; and a case in which the cellular telephone device 1 is placed on the battery charger 100 such that the front face thereof faces the battery charger 100 side.

In a case in which the cellular telephone device 1 is placed on the battery charger 100 such that the rear face thereof faces the battery charger 100 side, since the distance between the power transmitting coils 110 and the power receiving coils 10 is proximate, appropriate charging can be performed. On the other hand, in a case in which the cellular telephone device 1 is placed on the battery charger 100 such that the front face thereof faces the battery charger 100 side, as shown in FIG. 9a, since the distance between the power transmitting coils 110 and the power receiving coils 10 is increased, appropriate charging cannot be performed with such a quantity of power received.

In such a case, appropriate charging can be performed in the cellular telephone device 1 by performing control so as to increase the quantity of power transmitted, similarly to the example described in the second embodiment with reference to FIG. 6a.

Moreover, in cases in which the cellular telephone device 1 is placed on the battery charger 100 as shown in FIGS. 9b and 9c, appropriate charging can be performed by performing control so as to increase the quantity of power transmitted, similarly to the patterns described with reference to FIGS. 6b and 6c. In addition, in a case in which the cellular telephone device 1 is placed on the battery charger 100 as shown in FIG. 9d, appropriate charging can be performed by performing control so as to decrease the quantity of power transmitted, similarly to the pattern described with reference to FIG. 6d.

It should be noted that the pattern shown in FIG. 9c assumes a case in which, for example, the cellular telephone device 1 stored in a case made of an insulative material is placed on the battery charger 100. The pattern shown in FIG. 9d assumes a case in which, for example, the cellular telephone device 1 stored in a case made of a metallic material is placed on the battery charger 100.

It should be noted that the present invention is not limited to the aforementioned embodiments, and deformation, improvement and the like within the scope that enables achievement of the object of the invention are included in the present invention.

Furthermore, the wireless charging system described in the embodiments is configured to perform wireless charging without using a power supply cord or the like, by utilizing the so-called electromagnetic induction method, but it is not limited thereto. As long as the wireless charging system can wirelessly charge the cellular telephone device 1 without using a power supply cord or the like, the wireless charging system may employ, for example, a so-called radio wave method, in which the cellular telephone device 1 is charged by transmitting and receiving electromagnetic waves converted from an electric current via an antenna; a so-called electromagnetic field resonance method, in which the cellular telephone device 1 is charged by utilizing a resonance phenomena of an electromagnetic field; or the like.

Moreover, in the aforementioned embodiments, the wireless charging system is configured to includes two of the power receiving units 10, i.e. the power receiving unit 10(1) and the power receiving unit 10(2), but the wireless charging system is not limited thereto, and may be configured to include one or three or more of the power receiving units 10. It should be noted that, correspondingly to the power receiving units 10, the same number or more of the power transmitting units 110 may be provided.

In addition, although the embodiments of the present invention have been described by taking the cellular telephone device 1 (a portable electronic device) as a specific example, it is not limited thereto, and the present invention may also be applied to various electronic devices such as a PHS (Personal Handyphone System) terminal and a PDA (Personal Digital Assistant).

What is claimed is:

1. A wireless charging system, comprising:
   a charging device; and
   a portable electronic device that charges a secondary battery by utilizing electromagnetic waves being output from the charging device,
   wherein the portable electronic device includes:
   a plurality of receiving units that receive the electromagnetic waves being output from the charging device;
   a charging state monitoring unit that monitors a charging state of the secondary battery and determines an adjustment based on a quantity of power received or a low charged level relative to a predetermined value; and
   a first communication unit that communicates the adjustment to the charging device, and
   wherein the charging device includes:
   a plurality of output units that output the electromagnetic waves;
   a second communication unit that communicates with the portable electronic device to receive the adjustment; and
   an output control unit that controls an output from the plurality of output units, based on a result of monitoring by the charging state monitoring unit to adjust a quantity of power that is output from the plurality of output units based on the adjustment so that the plurality of output units output an adjusted quantity of power to the portable electronic device,
   wherein, when a plurality of portable electronic devices are placed on the charging device, the output control unit controls output of the plurality of output units, based on each result of monitoring the charging states received from the plurality of portable electronic devices, so that electromagnetic waves are preferentially output to a portable electronic device having a low quantity of power received or a low charged level among the plurality of portable electronic devices, and
   wherein, when the portable electronic device, to which the electromagnetic waves were preferentially output, reaches a predetermined charged state, the output control unit controls output of the plurality of output units, so that electromagnetic waves are output to the other portable electronic devices.

2. The wireless charging system according to claim 1, wherein the charging device further includes a switching unit, and
   wherein the output control unit controls that the switching unit switches an output from the plurality of output units.

3. The wireless charging system according to claim 2, wherein the output control unit controls that the switching unit switches sequentially the plurality of output units, and wherein the charging state monitoring unit monitors a charging state, corresponding to how the switching unit is controlled by the output control unit, thereby identifying the plurality of output units that output electromagnetic waves.

4. The wireless charging system according to claim 3, wherein the output control unit controls that the switching unit switches sequentially the plurality of output units that periodically perform an output.

5. The wireless charging system according to claim 1, wherein when the current value based on the electromagnetic waves acquired by the receiving units is low, the portable electronic device, based on a result of monitoring by the charging state monitoring unit, performs control to increase an output amount of the output units, and when the current value based on the electromagnetic waves acquired by the receiving units is high, the portable electronic device performs control to decrease an output amount of the output units.

6. A charging device, comprising:
   a plurality of output units that output electromagnetic waves to a portable electronic device for charging a secondary battery of the portable electronic device;
   a communication unit that communicates with the portable electronic device; and
   an output control unit that controls the electromagnetic waves being output from the plurality of output units to adjust a quantity of power that is output from the plurality of output units, based on an adjustment instruction received via the communication unit, so that the plurality of output units output an adjusted quantity of power to the portable electronic device,
   wherein, when a plurality of portable electronic devices are placed on the charging device, the output control unit controls output of the plurality of output units, based on each adjustment instruction received from the plurality of portable electronic devices, so that electromagnetic waves are preferentially output to a portable electronic device having a low quantity of power received or a low charged level among the plurality of portable electronic devices, and
   wherein, when the portable electronic device, to which the electromagnetic waves were preferentially output, reaches a predetermined charged state, the output control unit controls output of the plurality of output units, so that electromagnetic waves are output to the other portable electronic devices.

7. A method for controlling a wireless charging system that includes:
   a charging device that outputs electromagnetic waves from an output unit; and a portable electronic device that wirelessly receives the electromagnetic waves being output from the charging device, to charge a secondary battery, the portable electronic device performing operations comprising:
   receiving the electromagnetic waves being output from the charging device;
   monitoring a charging state of the secondary battery that is being charged by utilizing the electromagnetic waves received;
   determining an adjustment to a quantity of power based on a quantity of power received with the electromagnetic waves or a low charged level relative to a predetermined value; and
   transmitting a signal with the adjustment to the charging device, and the charging device performing operations comprising:
outputting the electromagnetic waves to the portable electronic device;
receiving the signal with the adjustment transmitted by the portable electronic device; and
controlling output of the electromagnetic waves, based on the adjustment so that an adjusted quantity of power is output to the portable electronic device,
wherein, when a plurality of portable electronic devices are placed on the charging device, the output of the electromagnetic waves is controlled, based on each adjustment signal received from the plurality of portable electronic devices, so that electromagnetic waves are preferentially output to a portable electronic device having a low quantity of power received or a low charged level among the plurality of portable electronic devices, and
wherein, when the portable electronic device, to which the electromagnetic waves were preferentially output, reaches a predetermined charged state, the output of the electromagnetic waves is controlled, so that electromagnetic waves are output to the other portable electronic devices.

\* \* \* \* \*